June 12, 1956  M. O. KILPATRICK  2,749,590
DEAIRING PEBBLE EXTRUSION CHAMBER
Filed Sept. 21, 1950
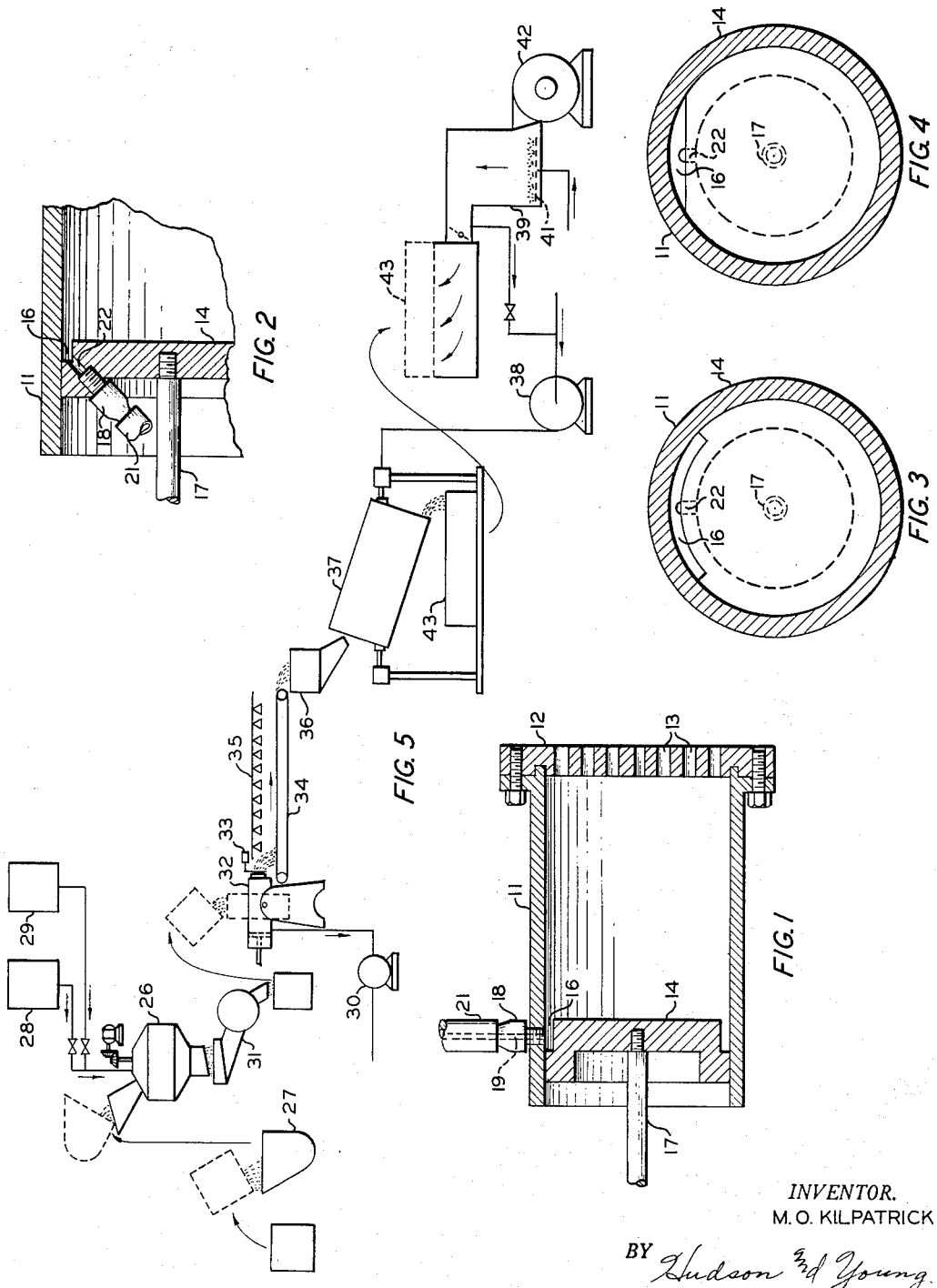
INVENTOR.
M. O. KILPATRICK
BY Hudson & Young
ATTORNEYS

United States Patent Office 2,749,590
Patented June 12, 1956

2,749,590

DEAIRING PEBBLE EXTRUSION CHAMBER

Myron O. Kilpatrick, Bartlesville, Okla., assignor to Phillips Petroleum Company, a corporation of Delaware Application September 21, 1950, Serial No. 186,097

9 Claims. (Cl. 25—15)

This invention relates to an improved process and apparatus for extrusion of plastic materials into particles of suitable shape. A specific aspect of the invention pertains to the extrusion of plastic ceramic materials in the form of a crumb into cylindrical rods suitable for cutting into short slugs which may then be tumbled into spheres.

It is conventional practice in the pebble making art to extrude a plastic mix comprising the pebble raw materials such as clays, alumina, metal oxides (singly or in combination) with suitable plasticizing agents and bonding materials into cylindrical rods which are then cut into short slugs for tumbling into small spheres.

It has been found highly beneficial if not essential to deair the mix in the extrusion chamber in order to form pebbles of sufficient strength and toughness to stand up properly under the severe conditions of cyclic thermal and mechanical shock of pebble heater processes. The use of a piston-type extruder has been found much superior to auger-type extruders in that the extruded articles coming from the piston-type deairing extruder are much more compact and free of void spaces than similar articles from an auger-type deairing extruder.

One extrusion apparatus for batch extrusion of plastic ceramic material in crumb form comprises a heavy steel cylinder having an extrusion die and a deairing die interchangeably fixed on one end thereof and a removable reciprocable solid piston in the other end thereof. In operation, this type of extruder with the deairing die on the extrusion end is rotated to a vertical position and, with the piston removed, is loaded from the top end with the material to be extruded. The cylinder is then rotated to the horizontal position and the piston is inserted so as to seal the back end of the piston for the deairing step. A vacuum is applied to the sealed cylinder by means of the deairing die and the piston is forced forward under a pressure of approximately 1000 p. s. i. g., so as to form a compact solid gas-free mass in the extruder. At this point the pressure is released, the deairing die is removed and replaced with the extrusion die which contains a series of cylindrical openings parallel to the axis of the cylinder and the pressure is again applied to the piston so as to extrude the mass of feed through the die in the form of cylindrical rods which are cut by a rotating knife into short cylinders of a length approximating their diameter. At the end of the extrusion stroke of the piston, the piston is removed from the cylinder, the extrusion die has to be removed and completely cleaned, and the solid plug of ceramic material remaining in the extrusion end of the cylinder must be cleaned out and returned to the feed preparation step. In this manner of operation with this type of extruder it is necessary to remove the extrusion die after each batch extrusion, completely clean the die and the plug from the end of the cylinder, and replace the extrusion die with the deairing die for the next operation.

It is an object of the present invention to provide an improved apparatus and process for extrusion of plastic materials. Another object of the invention is to provide an improved and simplified process for extrusion of extrudable materials. A further object of the invention is to provide a means for deairing an extrusion mix in a batch piston-type extruder without removal of the die and replacement thereof with a deairing head on each batch extrusion. Other objects of the invention will become apparent from a consideration of the accompanying disclosure.

The invention provides for the deairing of an extrudable mix in a piston-type extruder by means of a loose-fitting section on the nose of a close-fitting extruder piston so as to form a thin evacuating space between that section of the piston and the cylinder wall. Evacuation is effected through a passageway communicating with the thin evacuating space from a point outside of the cylinder. This passageway may pass through the cylinder wall directly from outside of the cylinder or in another modification it may pass through the wall of the piston from inside the cylinder and in either modification a connecting nipple is threaded or otherwise fixed thereto for connection with an evacuating hose or tube. When operating in accordance with the invention the extrusion die remains on the extrusion end of the cylinder during any number of batch extrusions, thus eliminating the time and material consuming interchanging of the extrusion die and the deairing die between batches in addition to the freeing of the extrusion die and the extrusion end of the cylinder of plastic material.

After loading the cylinder in the usual manner, the piston is inserted in the open end of the cylinder against the charge of crumb so as to form a seal and the air is evacuated from the charged cylinder through the evacuating space provided around the nose of the piston. The plug remaining in the end of the cylinder from the previous batch extrusion serves as a seal in the extrusion end of the cylinder. This plug is preferably several inches in thickness so as to provide ample strength to resist air pressure through the die. The deairing space around the nose of the piston is sufficiently thin or narrow to exclude the material being deaired and extruded while providing enough clearance between the offset nose of the piston and the cylinder wall to permit easy flow of air therethrough.

The loose fitting nose section of the piston may be formed by machining a rabbet entirely around the nose of the piston. This is a preferred modification of the apparatus since it permits escape of air from the charge into the deairing zone around the entire circumference of the cylinder. However, the space for evacuation or deairing may be confined to a relatively short section on the nose of the piston preferably located at the top side thereof. A clearance on the nose of the piston of approximately $\frac{1}{64}''$ has been found to be suitable in the extrusion of mixes comprising principally alumina and ball clay. This clearance may vary with different types of extrusion mixtures and in some instances may be as large as $\frac{1}{32}''$. Likewise it is possible to diminish the clearance to a thickness of about $\frac{1}{100}''$ and still obtain rapid deairing when applying a vacuum of 29 to 30 inches.

For a more complete conception of the invention, reference may be had to the drawing of which Figure 1 is a cross-sectional elevation of one modification of the extrusion cylinder. Figure 2 is a partial section of another modification of the extrusion cylinder showing a different arrangement of the evacuating tube. Figures 3 and 4 are transverse sections of an extrusion cylinder showing different modifications of the extrusion rabbet or die on the nose of the piston. Figure 5 is a schematic flow of pebble making process utilizing the deairing cylinder of the invention.

Referring to Figure 1, numeral 11 denotes a heavy steel cylinder having an extrusion die 12 containing cylindrical openings 13 fastened onto the forward end thereof. A piston 14, having a circumferential rabbet 16 on the nose thereof engages the inner wall of cylinder 11 and is connected by a piston rod 17 with an air cylinder or other compression device (not shown) which actuates the piston. Numeral 18 denotes a nipple having an opening 19 therethrough in communication with the interior of cylinder 11 just opposite the rabbet in the nose of the piston when the piston is in position for the beginning of the compression or extrusion stroke. A vacuum hose 21 connects with nipple 18 and with a suitable exhaust pump.

In operation of the extrusion device of Figure 1, the piston 14 is removed from cylinder 11 and a charge of crumb or suitable plastic material in comminuted form is loaded into the cylinder. This loading is preferably made when the cylinder is in vertical position and the amount thereof is regulated so as to bring the piston into the approximate position shown in the drawing when the piston is forced against the charge. In this manner, air in the charge and within the cylinder is readily evacuated through the side of the cylinder into passageway 19 in nipple 18 and hose 21 by the suction of an exhaust pump. After the charge is properly deaired, piston 14 is driven forward under suitable pressure so as to force the plastic material through openings 13 in die 12. A rotating knife working on the face of die 12 cuts off the extruded cylinders into suitable short lengths or slugs.

In the arrangement shown in Figure 2, the opening into the cylinder for evacuation of the air or gas therein is through the piston 14 shown at 22 instead of through the wall of the cylinder as shown in Figure 1.

Figures 3 and 4 show an arrangement similar to that of Figures 1 and 2, the difference being in the cut or rabbet in the nose of the piston for permitting evacuation of the gas from the cylinder and feed without plugging the evacuation opening. The rabbet in the piston in Figure 3 is similar to that in Figure 1 but extends over only a portion of the circumference of the piston. The piston in Figure 4 has a section machined from the nose thereof which is flat on the piston side and bounded by the arcuate section of the cylinder on the top side.

The process illustrated in Figure 5 involves loading a mixer 26 by means of a skip hoist 27 with a suitable charge of solid pebble raw materials. Water from a reservoir 28 and an organic plasticizing liquid from reservoir 29 are introduced to mixer 26 by means of connecting lines. After the mixing has produced a plastic mix of suitable consistency, it is passed into a shredder 31 for further plasticizing and cutting into a crumb which can be readily deaired. This crumb is then loaded into extrusion device 32 which deairs the crumb by means of section pump 30 and extrudes it into cylinders. A rotating knife 33 cuts the cylinders into short slugs as they emanate from the die and these slugs are picked up on an endless belt carrier 34 which conveys them slowly under a bank of infrared drying lamps so as to dry them to suitable consistency for tumbling. Conveyor 34 feeds the partially dried slugs into a hopper 36 which in turn feeds the slugs into a 3-dimensional tumbling drum 37. A warm air stream of controllable temperature is passed through tumbler 37 by means of blower 38 and lines connecting with air heater 39 and the axle of the tumbler. Air heater 39 contains burners 41 supplied by a fuel line. The air for heater 39 is supplied by blower 42. The main function of this air heater is to dry the spheres produced in tumbling drum 37. After sufficient tumbling of the slugs, spheres are formed which are collected in tray 43 which has a perforate bottom. This tray, after being loaded, is transferred to the frame of the drier and the hot air passing therethrough properly dries the spheres so that they may be loaded in the kiln to any suitable depth for firing.

*Example*

Four-hundred-fifty pounds of 325-mesh Bayer process alumina, precalcined to 2100° F., 24 pounds of 85% $H_3PO_4$, 30 pounds of purified but active light calcined $Al_2O_3$, 12 pounds of an aqueous solution of an organic plasticizer, and sufficient water to form a stiff mix was charged to a countercurrent batch mixer and mixed therein until a test sample required an extrusion pressure in the range of 900 to 1100 p. s. i. g. through an extrusion die containing a single extrusion opening of the size of the openings in the extrusion die on the main extruder. A mixing time of approximately 20 minutes was required.

The mix was then comminuted in a high speed hammer mill which shredded the mix in order to facilitate the deairing step. The shredded mix in the form of a coarse crumb was then loaded into a Farquhar extruder having 170 to 180 pounds capacity. This extruder was modified in accordance with the invention by machining a rabbet on the nose of the piston so as to provide a deairing space $1/64"$ in thickness completely surrounding the nose of the piston for a depth along the axis of the cylinder of $3/4"$. After loading the cylinder in the vertical position, the same was rotated to the horizontal position and the modified piston inserted in the open end of the cylinder against the charge therein. A 3" plug of material from a previous extrusion remained in the extrusion end of the cylinder at the time of loading. A vacuum of 29 to 30" was applied through a vacuum hose attached to a nipple on the top side of the cylinder opposite the rabbeted section of the piston, and this vacuum was maintained for a period of about 5 minutes. At the end of this time the charge was completely deaired and the piston was forced forward against the charge by means of an air cylinder in direct communication with a piston rod so as to force the charge through the extrusion die containing nineteen $5/16"$ holes. The $5/16"$ cylinders formed by the die were cut into $5/16"$ slugs by a revolving knife at the outside face of the die. These slugs were picked up by an endless belt conveyor and passed under a bank of drying lamps so as to change their moisture content from about 13% to about 11%.

The slugs were found to be extremely dense and compact with no indication of voids or air spaces. After collection of about 800 pounds of slugs, they were charged to a 3-dimensional rotation tumbler to which was fed a stream of 220° F. air so as to gradually dry the slugs as they were formed into spheres. The formation of spheres required about 6 hours. When the spheres were removed from the tumbler they were of sufficient strength to retain their shape when charged to a firing kiln in 5 to 6 ton lots. After firing for approximately 36 hours at 3050° F. and slowly cooling to air temperature, the resultant pebbles were found to be hard, dense, tough, and smooth.

The illustrative details set forth herein are not to be construed as imposing unnecessary limitations upon the invention, the scope of which is set forth in the claims.

I claim:

1. Apparatus for deairing and extruding an extrudable plastic mix which comprises in combination a hollow cylinder having in the forward end a closure member in the form of a die having a plurality of perforations therein; a removable reciprocable close-fitting piston in said cylinder having a flat nose and a loose-fitting section on same forming a narrow space between the nose of the piston and the cylinder of such thickness as to pass gas therethrough while withholding said mix; an exhaust line communicating with said narrow space from outside of said cylinder when said piston is in position for the extrusion stroke.

2. The apparatus of claim 1 in which said loose-fitting section comprises a rabbet on the nose of said piston at its periphery.

3. The apparatus of claim 2 in which said rabbet extends completely around the circumference of the piston.

4. The apparatus of claim 1 in which said exhaust line comprises an opening through the wall of said cylinder near the backend, opposite said groove when said piston is in position for the extrusion stroke.

5. The apparatus of claim 1 in which said exhaust line comprises an opening through said piston.

6. A process for extruding finely comminuted plastic extrudable ceramic material into shapes which comprises loading said material in the form of a crumb into a confined cylindrical zone having at least one restricted extrusion opening in one end thereof and a compact plastic plug of the material as an air seal completely covering said end, and having an open other end; sealing said other end with a close-fitting piston having a loose-fitting nose section forming a narrow air-evacuating zone between said loose-fitting nose section and the wall of said cylindrical zone; deairing said cylindrical zone by applying a vacuum thereto through said narrow air-evacuating zone and thru an opening in said piston connecting therewith and thereafter compacting the deaired crumb into a solid contiguous compact mass free of voids and forcing the same through said extrusion opening to form a shaped article.

7. The process of claim 6 in which said compact mass is forced through a series of circular orifices to form solid cylinders.

8. A process for extruding finely comminuted plastic extrudable ceramic material into rods suitable for cutting into short cylinders, which comprises loading said material in the form of a crumb into a cylinder having a series of extrusion openings in one end thereof and a compacted plastic plug of said material as an air seal completely covering said end, and having an open other end; sealing said other end by inserting a close-fitting piston therein, said piston having a loose-fitting nose section providing a narrow air evacuating space between said nose section and said cylinder; deairing said cylinder by applying a vacuum to said air evacuating space thru a channel leading from said space thru said piston; thereafter compacting the deaired crumb into a solid contiguous compact mass free of voids by forcing said piston toward said extrusion openings; and thereafter forcing said mass through said extrusion openings to form compact rods.

9. Apparatus for deairing and extruding an extrudable plastic mix which comprises in combination a hollow cylinder having in the forward end a closure member in the form of a perforate die; a removable piston in said cylinder having a cylindrical nose section loosely fitting said cylinder and a cylindrical body section closely fitting said cylinder so as to form an air seal with said cylinder, said cylindrical nose section forming a narrow annular space with said cylinder of such thickness as to pass gas therethrough while withholding said mix; an exhaust conduit through said piston to said annular space adapted for passing air therethrough during evacuation of said cylinder; and exhaust means connected with said conduit for evacuating said cylinder.

References Cited in the file of this patent

UNITED STATES PATENTS

| | | |
|---|---|---|
| 992,425 | Hyatt | May 16, 1911 |
| 1,826,586 | Williams | Oct. 6, 1931 |
| 1,964,266 | McElroy et al. | June 26, 1934 |
| 1,996,930 | McClintock | Apr. 9, 1935 |
| 2,007,074 | Clemens | July 2, 1935 |
| 2,307,055 | Menger et al. | Jan. 5, 1943 |
| 2,332,211 | Field | Oct. 19, 1943 |
| 2,368,404 | Bent et al. | Jan. 30, 1945 |
| 2,517,707 | Payne | Aug. 8, 1950 |
| 2,617,169 | Bodkin | Nov. 11, 1952 |